United States Patent
Chiang

(10) Patent No.: US 11,421,725 B2
(45) Date of Patent: Aug. 23, 2022

(54) FASTENER AND INTERFACE CARD

(71) Applicants: INVENTEC (PUDONG) TECHNOLOGY CORPORATION, Shanghai (CN); INVENTEC CORPORATION, Taipei (TW)

(72) Inventor: Tai-Yi Chiang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 422 days.

(21) Appl. No.: 16/714,230

(22) Filed: Dec. 13, 2019

(65) Prior Publication Data

US 2021/0071701 A1   Mar. 11, 2021

(30) Foreign Application Priority Data

Sep. 5, 2019   (CN) .......................... 201910836512.4

(51) Int. Cl.
  *F16B 23/00*   (2006.01)
  *F16B 39/24*   (2006.01)

(52) U.S. Cl.
  CPC .......... *F16B 23/0092* (2013.01); *F16B 39/24* (2013.01); *F16B 23/00* (2013.01)

(58) Field of Classification Search
  CPC .. F16B 23/00; F16B 23/0023; F16B 23/0092; F16B 23/003; F16B 35/06; F16B 39/24; F16B 43/025; Y10S 411/919
  USPC .......................... 411/383, 402, 403, 404, 405
  See application file for complete search history.

(56) References Cited

U.S. PATENT DOCUMENTS

| | | | | |
|---|---|---|---|---|
| 2,036,875 | A  * | 4/1936 | Kraft ...................... | B65D 39/12 411/902 |
| 5,054,982 | A  * | 10/1991 | Freeman .................. | B66C 1/66 411/397 |
| 8,348,570 | B2 * | 1/2013 | Ye ........................ | H01L 23/4006 411/383 |
| 8,757,693 | B2 * | 6/2014 | Fuller ..................... | B66C 1/66 294/215 |
| 2005/0095079 | A1* | 5/2005 | Beckers .................. | F16B 35/06 411/348 |
| 2008/0024993 | A1* | 1/2008 | Chu ...................... | H01L 23/4093 257/E23.102 |
| 2013/0014910 | A1* | 1/2013 | Zhu ....................... | F16B 5/0266 411/407 |
| 2013/0017034 | A1* | 1/2013 | Chen ...................... | F16B 35/06 411/372 |

(Continued)

*Primary Examiner* — Roberta S Delisle
(74) *Attorney, Agent, or Firm* — Maschoff Brennan

(57) ABSTRACT

A fastener including a screw part and a handle part. The screw part includes a head portion and a body portion that are connected to each other. A diameter of the body portion is smaller than a diameter of the head portion. The head portion includes a recess on a side of the head portion located away from the body portion. The handle part is pivotally connected to the head portion and pivotable between an operation position and a bent-down position. When the handle part is in the operation position, the handle part is partially located on a side of the head portion located away from the body portion. When the handle part is in the bent-down position, the handle part is located away from the side of the head portion located away from the body portion.

7 Claims, 5 Drawing Sheets

(56) References Cited

U.S. PATENT DOCUMENTS

| | | | |
|---|---|---|---|
| 2013/0017036 A1* | 1/2013 | Chen | F16B 35/06 411/397 |
| 2013/0017037 A1* | 1/2013 | Chen | F16B 35/06 411/378 |
| 2014/0314516 A1* | 10/2014 | Bowers | F16B 37/067 411/344 |
| 2015/0071732 A1* | 3/2015 | Hong | F16B 45/00 411/383 |
| 2018/0029846 A1* | 2/2018 | Verbrugge | F16B 39/101 |
| 2020/0089288 A1* | 3/2020 | Chung | G06F 1/185 |

* cited by examiner

FASTENER AND INTERFACE CARD

CROSS-REFERENCE TO RELATED APPLICATIONS

This non-provisional application claims priority under 35 U.S.C. § 119(a) on Patent Application No(s). 201910836512.4 filed in China, on Sep. 5, 2019, the entire contents of which are hereby incorporated by reference.

BACKGROUND OF THE INVENTION

Technical Field of the Invention

The invention relates to a fastener and an interface card, more particularly to a thumb screw and an interface card for the same.

Description of the Related Art

In general, a screw includes a threaded part and a head portion that are connected to each other, where the threaded part is configured to be fixed in a screw hole of an object and the head portion having larger cross-sectional area is configured for being rotated by a hand-tool such as a screwdriver or a wrench. The head portion has recess that is in a particular shape such as linear shape, cross shape, hexagonal shape or club shape. Specific hand-tool whose shape matches that of the recess can be engaged into the recess of the head portion and thus rotates the head portion, thereby screwing the threaded part into the screw hole or removing the threaded part from the screw hole.

The said conventional screw only can be screwed into screw hole of the object via the hand-tool so that the installation and removal of conventional screw are inconvenient. Accordingly, thumb screws that can be manually rotated and thus screwed into or removed from screw hole is proposed.

SUMMARY OF THE INVENTION

One embodiment of this invention provides a fastener including a screw part and a handle part. The screw part includes a head portion and a body portion that are connected to each other. A diameter of the body portion is smaller than a diameter of the head portion. The head portion includes a recess on a side of the head portion located away from the body portion. The handle part is pivotally connected to the head portion and pivotable between an operation position and a bent-down position. When the handle part is in the operation position, the handle part is partially located on a side of the head portion located away from the body portion. When the handle part is in the bent-down position, the handle part is located away from the side of the head portion located away from the body portion.

Another embodiment of this invention provides an interface card, configured to be disposed on a motherboard and including a circuit board and a fastener. The fastener includes a mounting part, a screw part and a handle part. The mounting part is disposed on the circuit board. The screw part includes a head portion and a body portion that are connected to each other. The head portion includes a recess on a side of the heat portion located away from the body portion. The screw part is disposed through the mounting part. The body portion is at least partially surrounded by the mounting part. The handle part is pivotally connected to the head portion between an operation position and a bent-down position. When the handle part is in the operation position, the handle part is partially located on a side of the head portion located away from the body portion. When the handle part is in the bent-down position, the handle part is located away from the side of the head portion located away from the body portion.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
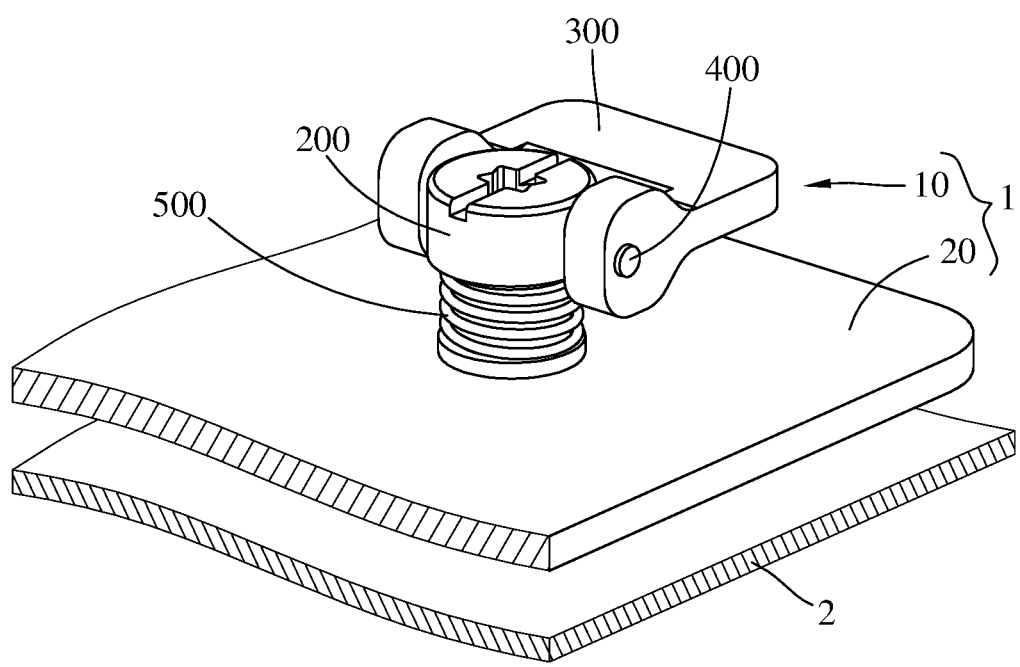
FIG. 1 is a partially enlarged perspective view of an interface card according to a first embodiment of the invention and a motherboard.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
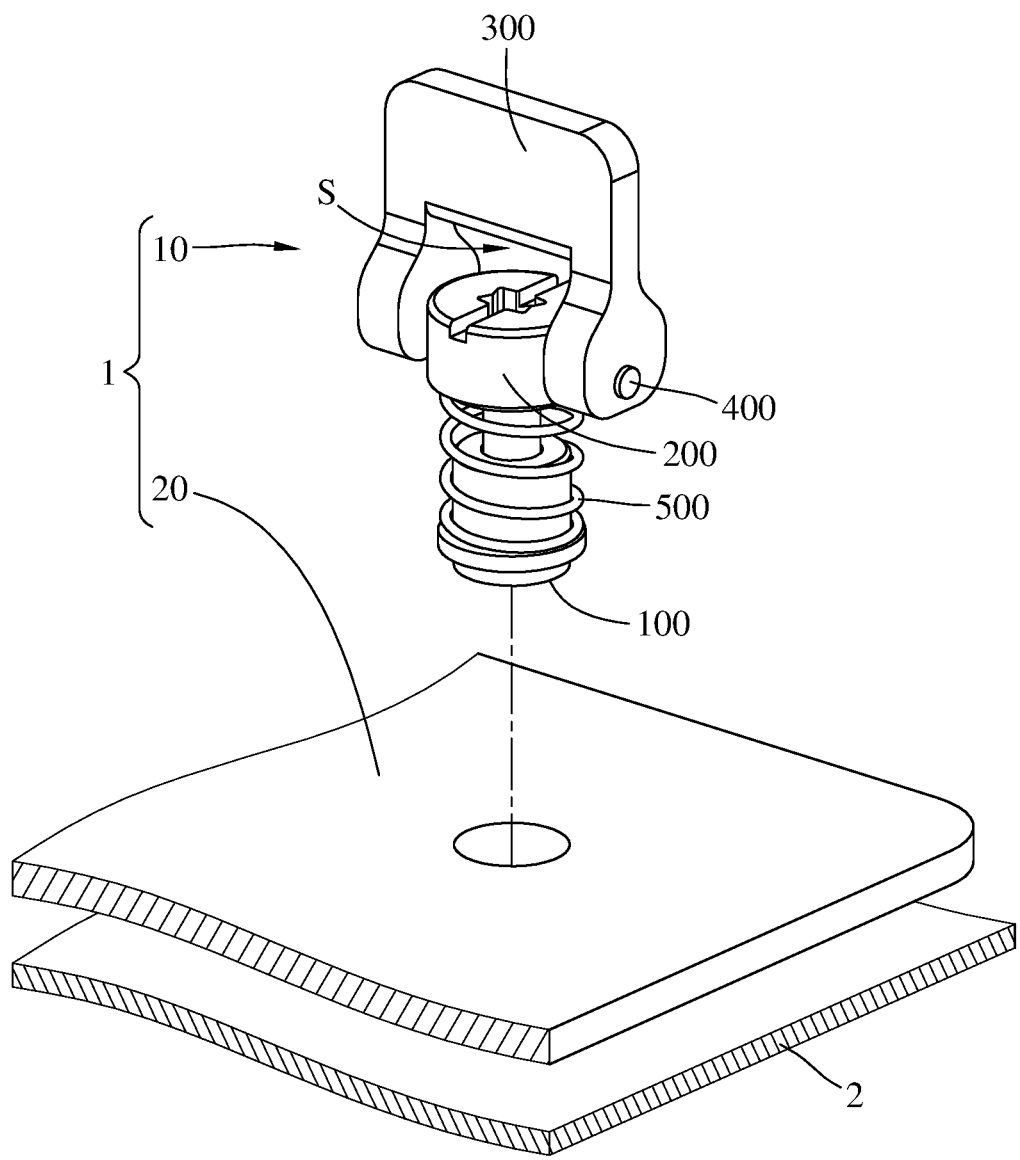
FIG. 2 is an exploded view of the fastener and the circuit board in FIG. 1.
Figure 3:
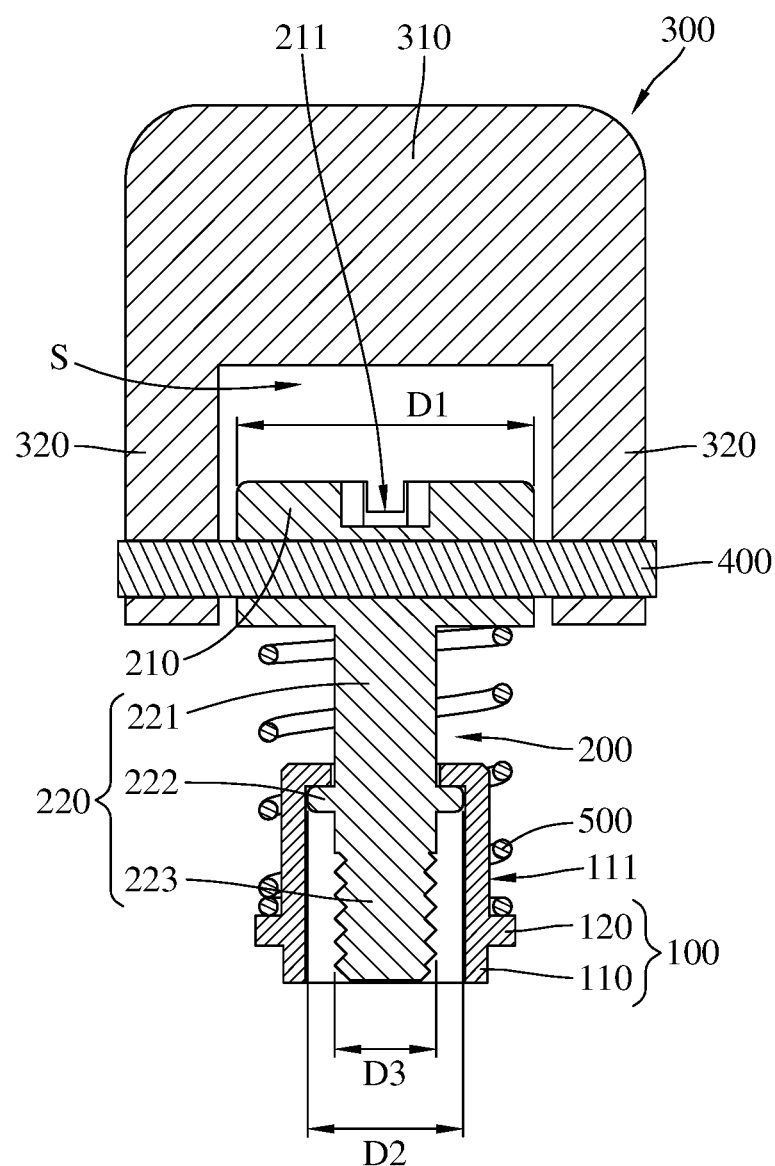
FIG. 3 is a cross-sectional view of the fastener in FIG. 2.

Please refer to FIG. 1 to FIG. 3, where FIG. 1 is a partially enlarged perspective view of an interface card according to a first embodiment of the invention and a motherboard, FIG. 2 is an exploded view of the fastener and the circuit board in FIG. 1, and FIG. 3 is a cross-sectional view of the fastener in FIG. 2.

In this embodiment, the interface card 1 includes a fastener 10 and a circuit board 20. The fastener 10 is disposed on the circuit board 20, and the circuit board 20 can be detachably fixed to a motherboard 2 via the fastener 10. In addition, the fastener 10 is, for example, a thumb screw and therefore can be rotated by fingers.

As shown, the fastener 10 includes a mounting part 100, a screw part 200, a handle part 300, a pivot 400, and an elastic component 500.

The mounting part 100 includes a barrel portion 110 and a flange portion 120. The barrel portion 110 is fixed to the circuit board 20 by, for example, welding. The flange portion 120 radially protrudes from an outer circumferential surface 111 of the barrel portion 110 and is used to abut the circuit board 20.

The screw part 200 includes a head portion 210 and a body portion 220 that are connected to each other, where the largest diameter of the body portion 220 is smaller than the diameter of the head portion 210. In addition, the head portion 210 includes a recess 211 on a side of the head portion 210 located away from the body portion 220. In this embodiment, the recess 211 is in, for example, a cross shape, but the invention is not limited thereto. In other embodiments, the recess is in a linear shape, a hexagonal shape or a club shape.

The body portion 220 of the screw part 200 is disposed through the mounting part 100 and therefore is partially surrounded by the mounting part 100. In detail, the body portion 220 includes a shank portion 221, a flange portion 222, and a threaded portion 223, where the shank portion 221 is connected to and located between the head portion 210 and the threaded portion 223, and the flange portion 222 radially protrudes from the outer surface of the shank portion 221. In addition, the diameter of the shank portion 221 and the major diameter of the threaded portion 223 is approximately the same (e.g., diameter D3), and the diameter of the shank portion 221 is smaller than or equal to the diameter of the insertion hole (not numbered) on the barrel portion 110 for the shank portion 221. Further, the diameter D2 of the flange portion 222 is larger than the diameter of the shank portion 221 (i.e., D2>D3). As shown, the diameter D2 is the diameter of the widest part (i.e flange portion) of the body portion 220 but it is still smaller than the diameter of the head portion 210 (e.g., D1). The shank portion 221 is disposed through the barrel portion 110 and therefore the flange portion 222 and the threaded portion 223 are surrounded by and accommodated in the barrel portion 110. As discussed, since the head portion 210 and the flange portion 222 are both wider than the insertion hole on the barrel portion 110, the shank portion 221 is movable relative to the barrel portion 110 but unable to be detached from the barrel portion 110.

In this embodiment, the shank portion 221 is as wide as the threaded portion 223, but the invention is not limited thereto. In other embodiments, the diameter of the shank portion is different from the major diameter of the threaded portion.

Figure 4:
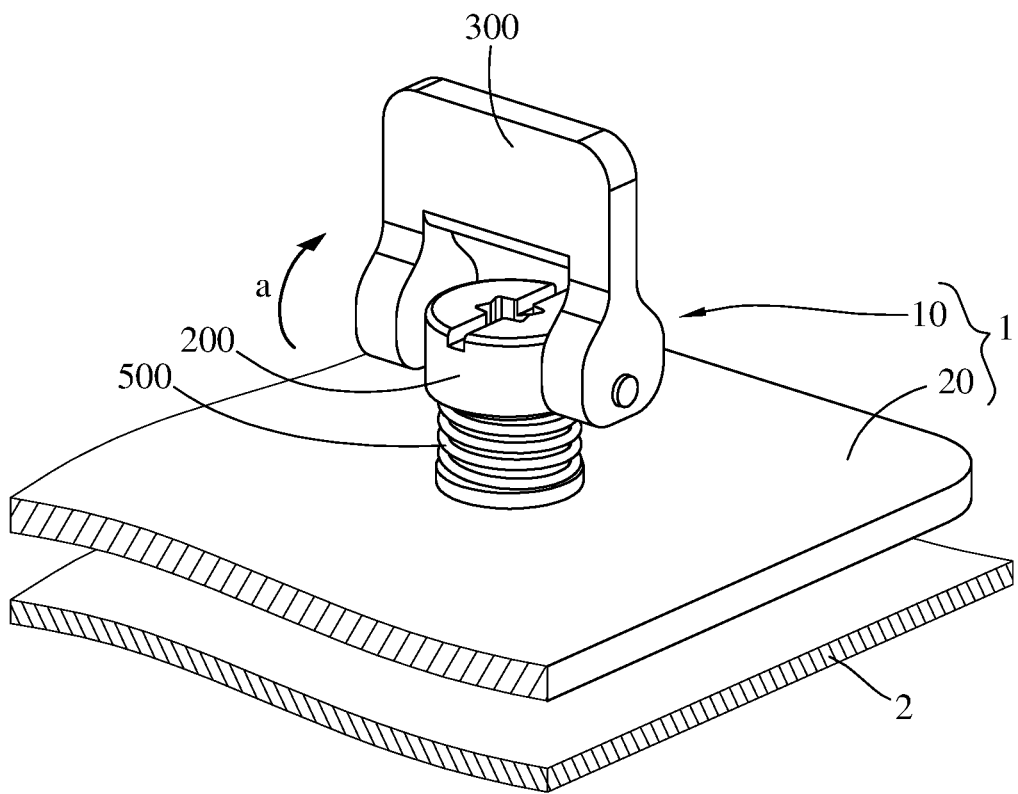
FIG. 4 and FIG. 5 depict the installation process of the fastener in FIG. 1.
Figure 5:
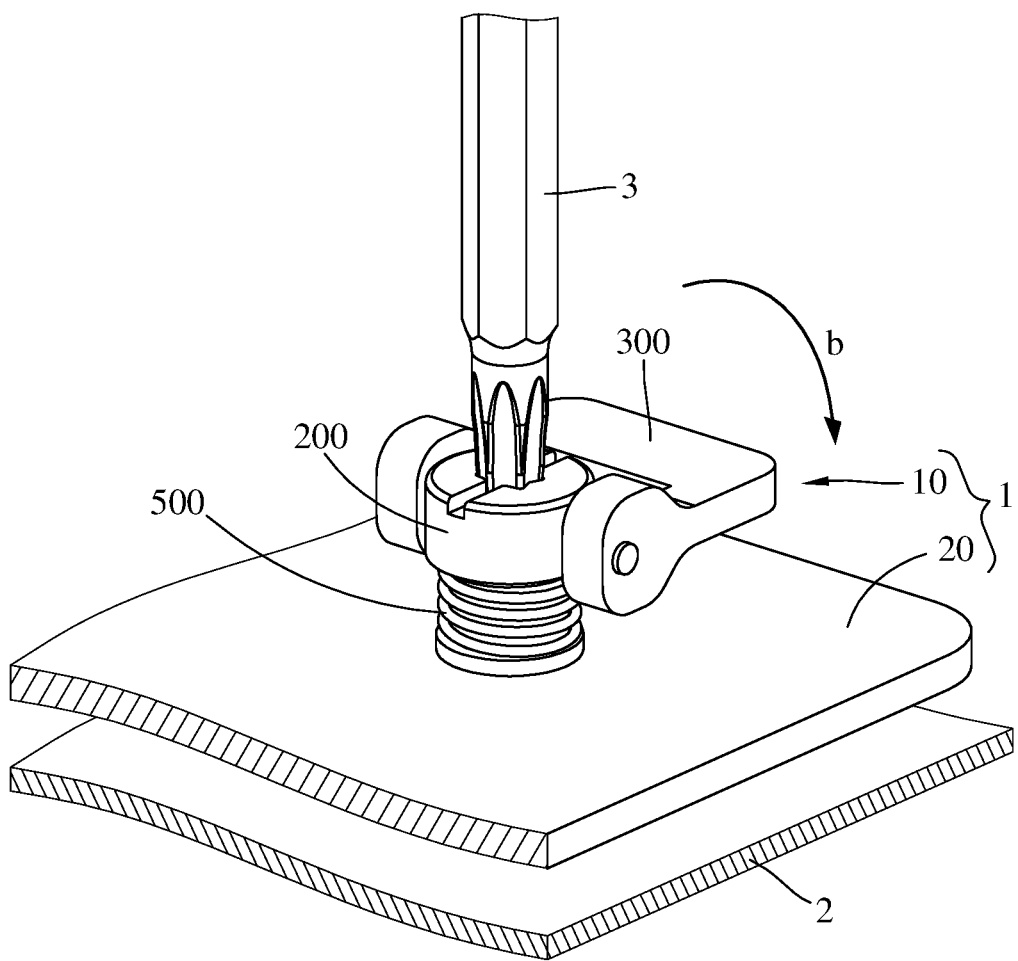

The handle part 300 includes a bridge portion 310 and two pivoting portions 320. The bridge portion 310 is connected to and located between the pivoting portions 320. As shown, the bridge portion 310 and the pivoting portions 320 together form an accommodation space S therebetween. The pivoting portions 320 are respectively pivotally connected to two opposite sides of the head portion 210 of the screw part 200 via the pivot 400 and therefore the head portion 210 is located between the pivoting portions 320 and located in the accommodation space S. As such, the handle part 300 is pivotable relative to the screw part 200 and switchable between an operation position (as shown in FIG. 4) and a bent-down position (as shown in FIG. 5). When the handle part 300 is in the operation position, the head portion 210 is located between the bridge portion 310 and the body portion 220. When the handle part 300 is in the bent-down position, the bridge portion 310 is bent to a position substantially parallel to the circuit board 20.

The elastic component 500 is, for example, a compression spring clamped by the flange portion 120 of the mounting part 100 and the head portion 210 of the screw part 200, and the elastic component 500 is used to constantly force the head portion 210 of the screw part 200 to move away from the barrel portion 110.

In this embodiment, the elastic component 500 is a compression spring, but the invention is not limited thereto. In other embodiments, the elastic component is an extension spring connected to the flange portion of the mounting part and the heat portion of the screw part.

There are two ways to operate the fastener 10. Please refer to FIG. 4 and FIG. 5, two installation processes of the interface card are provided.

The first way is done by fingers. As shown in FIG. 4, the handle part 300 of the fastener 10 can be pivoted to the operation position (e.g., along a direction a), such that the user is allowed to rotate the fastener 10 in the desired direction by pinching the handle part 300. By doing so, the threaded portion 223 of the screw part 200 can be screwed into or disengaged from the motherboard 2 without using hand tool.

Also, since the handle part 300 is located on the side of the head portion 210 located away from the circuit board 20 when it is in the operation position, the fingers would not interfere with the electronic components nearby the fastener 10 while pinching the handle part 300. Therefore, the electronic components on the circuit board 20 can be arranged very close to the fastener 10 during the manufacturing process, that is, there is no need to have a keep-out area around the fastener for the operation of the fastener. Accordingly, the fastener 10 does not limit the available space on the circuit board 20 for the electronic components, which helps the interface card 1 accommodate more electronic components to enhance the performance or achieve a compact interface card.

As shown in FIG. 5, the handle part 300 can be switched to the bent-sown position (e.g., along a direction b) to make it uncover the head portion 200 of the screw part 200, and then a hand tool 3 can be used to operate the fastener 10. By doing so, the threaded portion 223 of the screw part 200 can also be screwed into or disengaged from the motherboard 2.

According to the fastener and the interface card discussed above, since the fastener includes both of the handle part and the recess on the head portion, the fastener can be operated by fingers or hand tool.

Further, since the handle is pivotally connected to the screw, the handle can be pivoted to the side of the head portion of the screw located away from the circuit board when the screw is required to be rotated manually. In this way, the fingers would not interfere with the electronic components nearby the fastener while pinching the handle part. Therefore, there is no need to have a keep-out area around the fastener for operation of the fastener. Accordingly, the fastener does not limit the available space on the circuit board for the electronic components, which helps the interface card to accommodate more electronic components to enhance the performance or achieve a compact interface card.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A fastener, comprising:
   a screw part, comprising a head portion and a body portion that are connected to each other, wherein a diameter of the body portion is smaller than a diameter of the head portion, and the head portion comprises a recess on a side of the head portion located away from the body portion; and
   a handle part, pivotally connected to the head portion and pivotable between an operation position and a bent-down position;
   wherein when the handle part is in the operation position, the handle part is partially located on a side of the head portion located away from the body portion, and when the handle part is in the bent-down position, the handle part is located away from the side of the head portion located away from the body portion;
   wherein the fastener further comprises a mounting part, the mounting part is configured to be disposed on a circuit board, the screw part is disposed through the mounting part, and the body portion is at least partially surrounded by the mounting part;

wherein the mounting part further comprises a barrel portion and a flange portion, the barrel portion is configured to be mounted on the circuit board, the screw part is disposed through the barrel portion, and the flange portion of the mounting part protrudes from an outer surface of the barrel portion; and wherein the body portion of the screw part comprises a shank portion, a flange portion and a threaded portion that are sequentially connected, the shank portion is connected to a side of the head portion located away from the recess, the shank portion is disposed through the barrel portion, and the barrel portion surrounds the flange portion of the screw part and the threaded portion.

2. The fastener according to claim 1, further comprising a pivot, wherein the handle comprises a bridge portion and two pivoting portions, the bridge portion is connected to and located between the two pivoting portions, the bridge portion and the two pivoting portions together form an accommodation space therebetween, the two pivoting portions are pivotally connected to the head portion of the screw part via the pivot, and the head portion of the screw part is located between the two pivoting portions and located in the accommodation space.

3. The fastener according to claim 1, further comprising an elastic component, wherein the elastic component is clamped by the flange portion of the mounting part and the head portion of the screw part.

4. The fastener according to claim 3, wherein the elastic component is a compression spring.

5. The fastener according to claim 1, wherein the recess is in a cross shape, linear shape, hexagonal shape or club shape.

6. An interface card, configured to be disposed on a motherboard, the interface card comprising:
 a circuit board; and
 a fastener, comprising:
  a mounting part, disposed on the circuit board;
  a screw part, comprising a head portion and a body portion that are connected to each other, the head portion comprising a recess on a side of the heat portion located away from the body portion, the screw part is disposed through the mounting part, and the body portion is at least partially surrounded by the mounting part; and
  a handle part, pivotally connected to the head portion between an operation position and a bent-down position;

wherein when the handle part is in the operation position, the handle part is partially located on a side of the head portion located away from the body portion, when the handle part is in the bent-down position, the handle part is located away from the side of the head portion located away from the body portion;

wherein the fastener further comprises a mounting part, the mounting part is configured to be disposed on a circuit board, the screw part is disposed through the mounting part, and the body portion is at least partially surrounded by the mounting part;

wherein the mounting part further comprises a barrel portion and a flange portion, the barrel portion is configured to be mounted on the circuit board, the screw part is disposed through the barrel portion, and the flange portion of the mounting part protrudes from an outer surface of the barrel portion; and wherein the body portion of the screw part comprises a shank portion, a flange portion and a threaded portion that are sequentially connected, the shank portion is connected to a side of the head portion located away from the recess, the shank portion is disposed through the barrel portion, and the barrel portion surrounds the flange portion of the screw part and the threaded portion.

7. The interface card according to claim 6, wherein the fastener further comprises a pivot, the handle part comprises a bridge portion and two pivoting portions, the bridge portion is connected to and located between the two pivoting portions, the bridge portion and the two pivoting portions together form an accommodation space therebetween, the two pivoting portions are pivotally connected to the head portion of the screw part via the pivot, and the head portion of the screw part is located between the two pivoting portions and located in the accommodation space.

* * * * *